United States Patent [19]

Levstik

[11] 4,176,489

[45] Dec. 4, 1979

[54] FISHING LURE WITH RETRACTABLE AND AUTOMATICALLY EXTENDABLE HOOK

[76] Inventor: Frank T. Levstik, 655 E. Main St. (Space 68), San Jacinto, Calif. 92383

[21] Appl. No.: 862,483

[22] Filed: Dec. 20, 1977

[51] Int. Cl.² ............................................. A01K 85/02
[52] U.S. Cl. ......................................................... 43/35
[58] Field of Search ..................... 43/15, 35, 37, 34, 36

[56] References Cited

U.S. PATENT DOCUMENTS

| | | | |
|---|---|---|---|
| 2,589,343 | 3/1952 | Cieslik | 43/35 |
| 2,729,013 | 1/1956 | Chandler | 43/35 |
| 3,018,582 | 1/1962 | Anderson | 43/35 |
| 3,337,980 | 8/1967 | Farajian | 43/35 |
| 3,411,233 | 11/1968 | Hopper | 43/35 |

Primary Examiner—Nicholas P. Godici
Attorney, Agent, or Firm—Dana E. Keech

[57] ABSTRACT

A bait-fish-like lure body molded in two halves glued together to meet face to face in the vertical longitudinal axial plane of said body except where said half bodies are recessed to one side or the other or in both lateral directions from said plane to provide internal chambers in said body for accommodating a hook pivot pin, a hook having a hub pivoted on said pin, said hub having a radial wire arm, a hook extending and retracting bar apertured to slideably receive said hub arm and notched on opposite sides to trap a coiled expansion spring thereon, and notched on one side near its front end to form a cocking shoulder, and bent at said front end to form a cocking handle, a trigger pivot pin near said cocking shoulder and a trigger lever pivoting on said pin and swingable upwardly into opposition to said cocking shoulder when said handle is pulled forwardly to cock said hook with this retracted into said lure, while also swinging the main rear portion of said trigger lever outwardly where it will be likely to be depressed into said body by a fish striking said lure, thus releasing the hook causing it to be spring extended upwardly into said fish's mouth.

2 Claims, 7 Drawing Figures

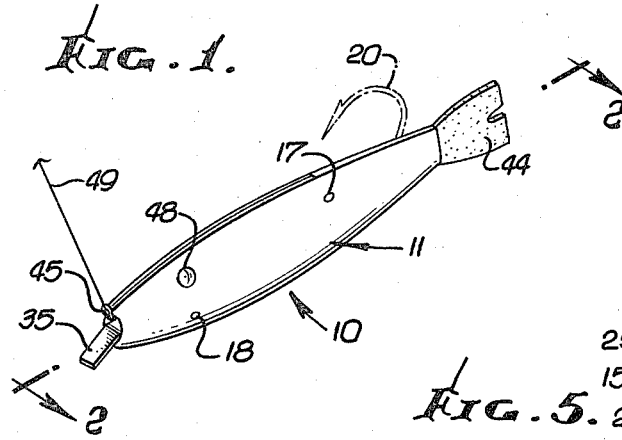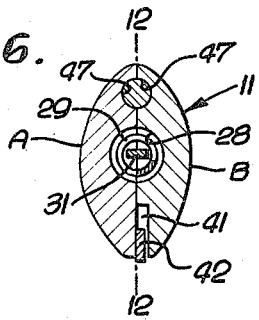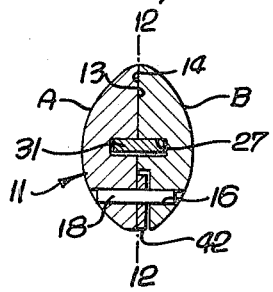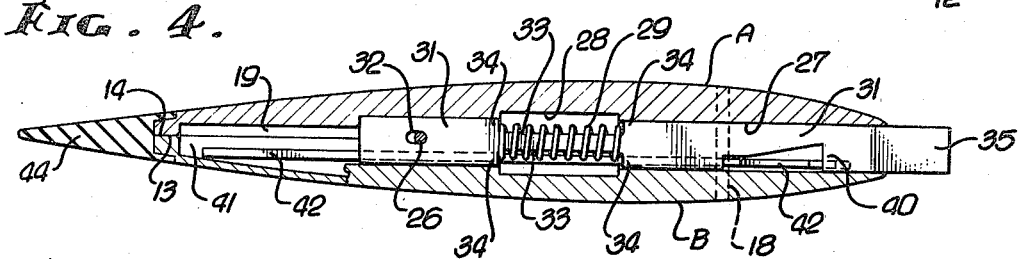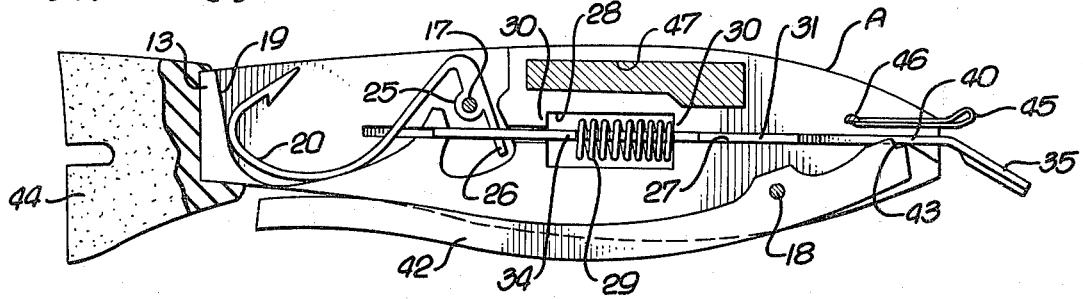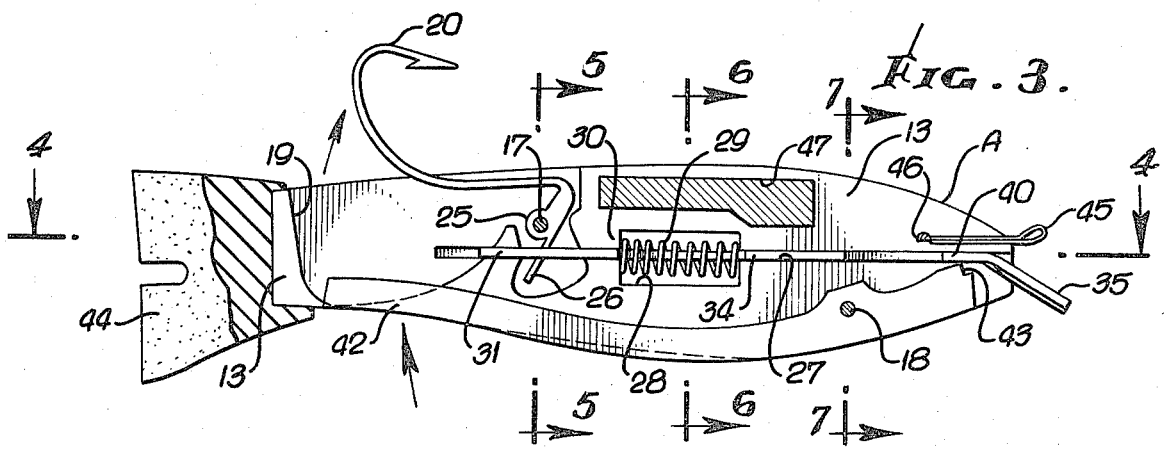

FISHING LURE WITH RETRACTABLE AND AUTOMATICALLY EXTENDABLE HOOK

SUMMARY OF THE INVENTION

Heretofore many fishing lures have been provided to which one or more triple hooks have been loosely attached, the purpose being to snag the fish as it approaches the otherwise attractive lure. I have discovered a tendency of discerning fish to avoid lures having hooks dangling therefrom and thereby escaping capture.

It is an object of the present invention to provide an attractive fish lure which, although carrying a hook, conceals this until after the fish strikes.

Another object is to completely retract the hook within the lure, up to the moment of the strike, and at that very moment, when the fish is most vulnerable to this, automatically extending the heretofore concealed hook upwardly into the mouth of the fish.

A further object is to provide such a lure in which the hook may be readily retracted to and cocked in its concealed position following a strike.

BRIEF DESCRIPTION OF THE DRAWINGS

FIG. 1 is a perspective view of a preferred form of the invention showing this in full lines with hook visible (being retracted within the lure) and showing, in broken lines, the hook as this appears when extended incidental to the lure being attacked by a fish.

FIG. 2 is an enlarged vertical longitudinal sectional view taken on the line 2—2 of FIG. 1.

FIG. 3 is a view taken on the same line as FIG. 2 showing the hook trigger-lever-actuated to cause the hook to be spring extended upwardly and facing forwardly from its position at the rear of the lure.

FIG. 4 is a horizontal medial cross sectional view taken on the line 4—4 of FIG. 3.

FIG. 5 is a transverse vertical cross sectional view taken through the hook pivot pin on line 5—5 of FIG. 3.

FIG. 6 is a similar view taken through the coil spring on line 6—6 of FIG. 3.

FIG. 7 is a similar view taken through the trigger pivot pin on the line 7—7 of FIG. 3.

DETAILED DESCRIPTION OF THE PREFERRED EMBODIMENT

The lure 10 referred to hereinabove includes a fishlike lure body 11 which is divided along its vertical longitudinal plane of symmetry 12—12 into left and right matching body halves A and B. In those areas within body 11 where apertures or chambers are required for occupancy by various operative elements of lure 10, such are recessed from the respective inside matching faces 13 and 14 of body halves A and B. In completing the assembly of the lure 10, the balance of said matching faces 13 and 14 of body halves A and B are glued together wherever they are in abutment.

In this manner body 11 is provided with transverse holes 15 and 16 to be occupied by pivot pins 17 and 18. Body half A has routed from its matching face 13 a shallow but extensive hook chamber 19 which houses a hook 20 within lure 10, said hook having a hub 25 which pivots on pin 17 and from which an actuating arm 26 extends downwardly.

Hollowed from matching faces 13 and 14 of body halves A and B, equal depths oppositely in the horizontal plane marked by line 4—4 in FIG. 3, is a flat chamber 27 which extends from chamber 19 to the front end of the lure 10.

Just forward from the front end of chamber 19, an enlargement 28 is formed concentrically with chamber 27 to accommodate a coil spring 29 and form shoulders 30 at opposite ends of enlargement 28 forming limit stops for the ends of said spring.

Occupying flat chamber 27 and slideable lengthwise therein, and rearwardly into hook chamber 19, and through enlargement 28, is a hook extending and retracting bar 31, said bar having a hole 32 to slideably receive downward extending hook hub arm 26, and a pair of long opposed notches 33 in which coil spring 29 is wound between expansion limiting bar shoulders 34. At its front end, bar 31 is inclined downward to form a lure tongue or handle 35. Directly behind this, said bar is notched on the right side to form a cocking latch shoulder 40.

Matching face 14 of body half B is recessed as shown in FIGS. 5, 6 and 7 to provide a flat vertical chamber 41 extending almost the full length of said half body, this chamber being provided to accommodate a cocking lever 42, which pivots on pin 18, said lever having a notch 43 in its upper front corner which is adapted to fit over latch shoulder 40 when handle 35 is pulled forward to retract said hook into chamber 19 and cocking lever 42 is rocked counterclockwise about pin 18, as shown in FIG. 2.

Complementary conventional features which may desireably be incorporated in lure 10 embrace fitting a molded rubber tail 44 to the body 11 and mounting a towing eye 45 on its front end which eye may comprise a cotter pin fitting into an axial bore lying in the vertical axial plane 12—12 and with free ends 46 of said cotter out-turned and hooked into half bodies A and B.

Internal cavities 47 shown in the drawings are for the purpose of impregnating the lure with an olefactory, smell-exciting bait. A realistically colored fish eye 48 may also be painted on each of the half bodies A and B to render lure 10 more lifelike in appearance.

OPERATION

As shown in FIG. 1, the lure 10 is commonly trolled when used for fishing, the lure being towed by a fishing line 49 tied to towing eye 45 with the lure cocked to retract the hook 20 as shown in full lines in FIGS. 1 and 2. When the lure is thus cocked, the cocking lever 42 is swung about its pivot pin 18 to elevate notch 43 behind shoulder 40 thereby holding bar 31 forwardly with coil spring 29 compressed between shoulders 30 at the front of chamber 28 and shoulders 34 at the rear of notches 33 in bar 31. The latter bar is thus cocked forward as shown in FIG. 2 with hook arm 26 swung forwardly to depress hook 20 entirely within body chamber 19. The upward swinging of the front end of cocking lever 42 about pin 18 to thus cock the lure 10, swings the balance of said lever downwardly about one quarter of an inch below the body 11 (See FIG. 2).

Due to the convex profile of trigger 42, its downward position, when cocked, is in harmony with the lower contour of the fish bait-like body 11, so as not to impair the lifelike appearance of the lure, yet this extended position of lever 42 assures operation of the cocking lever 42, by a fish striking the lure, whereby the notch 43 of said lever is depressed from in front of shoulder 40 on bar 31, immediately releasing the compressed spring 29 and whipping the hook 20 up out of the chamber 19 and into the mouth of the fish.

After removing the fish from the lure 10, the nose of the lure is held vertically on edge between a thumb and forefinger of one hand placed respectively thereabove and therebelow, pressure thus being applied against the nose of the lure to swing the front end of the cocking lever 42 upwardly against bar 31 while the other hand is applied to handle 35 to pull said bar forwardly until notch 43 rises behind latching shoulder 40. Thus, the re-cocking of lure 10 is completed, with the downward trailing rear portion of cocking lever 42 again awaiting elevation by the next strike to release bar 31 and spring 29 to eject hook 20 upwardly into an attacking fish.

The claims are:

1. In combination:
 a bait-fish shaped lure body;
 a fish hook mounted in said body to be spring biased into a position extended therefrom;
 trigger means for latching said hook in a position retracted into said body and operable when engaged by a fish seizing said lure in its mouth to release said hook causing it to be spring extended from said body and into said fish;
 said lure body being molded in two halves which fit together on the longitudinal axial plane of symmetry of said body excepting where one or the other or both of said body halves are recessed laterally from said plane to provide chambers to accommodate the following operative elements in said body;
 a hook pivot pin;
 said fish hook having a hub, pivoted on said pin;
 a radial actuating wire arm provided on said hub;
 a hook extending and retracting bar apertured to slideably receive said hub arm and notched on opposite sides to trap a coiled expansive spring thereon;
 said bar being notched on one side near its front end to form a cocking shoulder, and forming at its front end a cocking handle for said lure;
 a trigger pivot pin near said cocking shoulder; and
 a trigger lever pivoting on said pin and swingable into opposition to said cocking shoulder when said handle is pulled forwardly to cock said lure with said hook retracted into said lure, while also swinging the rear end portion of said trigger lever outwardly where it will practically certainly be depressed upwardly into said body by a fish seizing said lure in its mouth thereby releasing the hook biasing spring to extend the hook from the lure and into the fish.

2. In combination:
 a bait-fish-shaped lure body formed in two halves and glued together in the longitudinal vertical axial plane of symmetry of said body after said halves are recessed to provide chambers to accommodate the other lure parts herein recited and after said parts have been assembled in said chambers;
 there being a thin axial fish hook enclosing chamber opening vertically upwardly from the tail half of said body;
 a hook pivot pin mounted transversely in a hole in said body near the forward lower corner of said hook chamber which pin provides a fixed pivot for a bored hub of a fish hook thus rockably mounting said hook on said pivot pin and permitting said hook to be optionally extended upward from said chamber or retracted back down into said chamber, the hub of said hook having a radial hook driving arm extending downward beneath said pin in the hook confining chamber;
 shaped axially and centrally from said lure body is a short cylindrical square ended chamber for closely confining, endwise, a coiled wire spring under linear compression;
 a flat, horizontal bar confining chamber being hollowed symmetrically from said lure body to connect the front end of the afore recited fish hook chamber co-axially with said short coiled spring confining chamber and to then connect the latter chamber with the mouth of the lure body;
 occupying said flat bar chamber and slideable lengthwise therein and rearwardly into said hook chamber, and forwardly through said coil spring confining chamber and out at the mouth of said body is a hook extending and retracting bar, said bar having an elongated vertical hole near its rear end which slideably receives said radial hook driving arm thereby forming a rod and crank driving connection between said bar and said hook;
 notched alike for a short distance on opposite sides, said bar is thereby narrowed to trap said coil spring which spring is wound on the notched bar area with the lure under compression and with said spring trapped in overlapping relation both by said twin opposed bar notches and by said square ended coiled spring confining lure body chamber;
 said bar being notched on one side near its front end to form a cocking notch and shoulder, and also extended therebeyond to form a lure tongue or cocking handle for use in cocking the lure;
 recessed within the bottom edge of the lure body and pivoted on said body to latch said bar with the fish hook retracted is a cocking trigger which, when latching the lure in hook retracted position is itself extended in a manner insuring engagement by an attacking fish which will automatically extend the hook and capture the fish.

* * * * *